United States Patent [19]
Rao

[11] 3,822,715
[45] July 9, 1974

[54] IRRIGATION SIPHON APPARATUS

[76] Inventor: Eddya Gopalakrishna Rao, Katekar Mangalore S. K., India

[22] Filed: Jan. 23, 1973

[21] Appl. No.: 326,109

[52] U.S. Cl. .................................. 137/140, 137/135
[51] Int. Cl. .............................................. F16l 43/00
[58] Field of Search ........... 137/131, 135, 140, 151, 137/399

[56] References Cited
UNITED STATES PATENTS

| | | | |
|---|---|---|---|
| 306,523 | 10/1884 | Read | 137/135 |
| 335,236 | 2/1886 | Parsons | 137/135 X |
| 526,088 | 9/1894 | Savill | 285/191 |
| 1,025,608 | 5/1912 | Bliss | 137/135 |
| 1,181,820 | 5/1916 | Young | 137/140 X |
| 2,844,147 | 7/1958 | Beacham | 137/399 X |
| 2,972,412 | 2/1961 | Lundeen | 137/399 X |
| 3,146,788 | 9/1964 | Mahlstedt et al. | 137/399 |
| 3,347,586 | 10/1967 | Sharp | 137/140 X |

FOREIGN PATENTS OR APPLICATIONS

| | | | |
|---|---|---|---|
| 841,697 | 5/1939 | France | 137/131 |
| 356,221 | 11/1905 | France | 137/135 |

*Primary Examiner*—Alan Cohan
*Assistant Examiner*—Gerald A. Michalsky
*Attorney, Agent, or Firm*—Charles W. Chandler

[57] ABSTRACT

An irrigation siphon having a pair of float-operated valves on opposite ends of an elongated conduit. The conduit is disposed on a levee to receive water through one of the valves for delivery out the other valve. Each valve has a float arranged such that when the water at the inlet end of the conduit falls below a predetermined level, the outlet valve is closed such that the siphon is continually primed even though it is not passing water.

6 Claims, 3 Drawing Figures

PATENTED JUL 9 1974 3,822,715

IRRIGATION SIPHON APPARATUS

BACKGROUND OF THE INVENTION

This invention is related to siphon apparatus for delivering water from an irrigation channel, and more particularly to a portable siphon that remains primed even though the flow of water through the inlet is temporarily interrupted.

Siphon tubes are used to distribute irrigation water from a supply channel onto the surface of the field. This method of applying irrigation water permits the construction of relatively simple water conveying channels formed by two earthen levees spaced a convenient distance apart. A water stream flowing between the levees fills the channel by the installation of a temporary dam. A siphon tube consisting of a short length of bent plastic pipe is filled with water and placed such that opposite ends of the siphon are on opposite sides of a levee with one end being submerged in the water to pass the water through the siphon tube to its opposite end.

One problem with conventional, simple siphon tubes is a tendency to become deprimed due to either an accidental lifting of the siphon tube, or an interruption of the water supply due to a power failure of the pumps employed to transfer the water into the supply channel. Sometimes soil or other material floating in the supply channel chokes the siphon inlet. In some large irrigation systems, a sudden power failure can simultaneously incapacitate several hundred siphons. The irrigation personnel then have to quickly reprime all the siphons when the water supply is resumed. Should the channel feed water be started without also simultaneously starting most of the siphons, an entire section of the supply channel can be washed away causing damage to the standing crop.

SUMMARY OF THE INVENTION

The broad purpose of the present invention is to provide an improved portable irrigation siphon apparatus that remains primed at such times as the water flow in the supply channel should become interrupted. In the preferred embodiment of the invention, the entire siphon apparatus can be removed from one channel and carried to another channel without becoming deprimed. Thus, when the water level at the inlet end of the siphon is restored to its normal level, the siphon automatically resumes passing water from the supply channel.

These and other objects and advantages of the invention will become readily apparent to those skilled in the art to which the invention pertains upon reference to the following detailed description.

DESCRIPTION OF THE DRAWINGS

The description refers to the accompanying drawing in which like reference characters refer to like parts throughout the several views, and in which.

DESCRIPTION OF THE PREFERRED EMBODIMENTS

Figure 1:
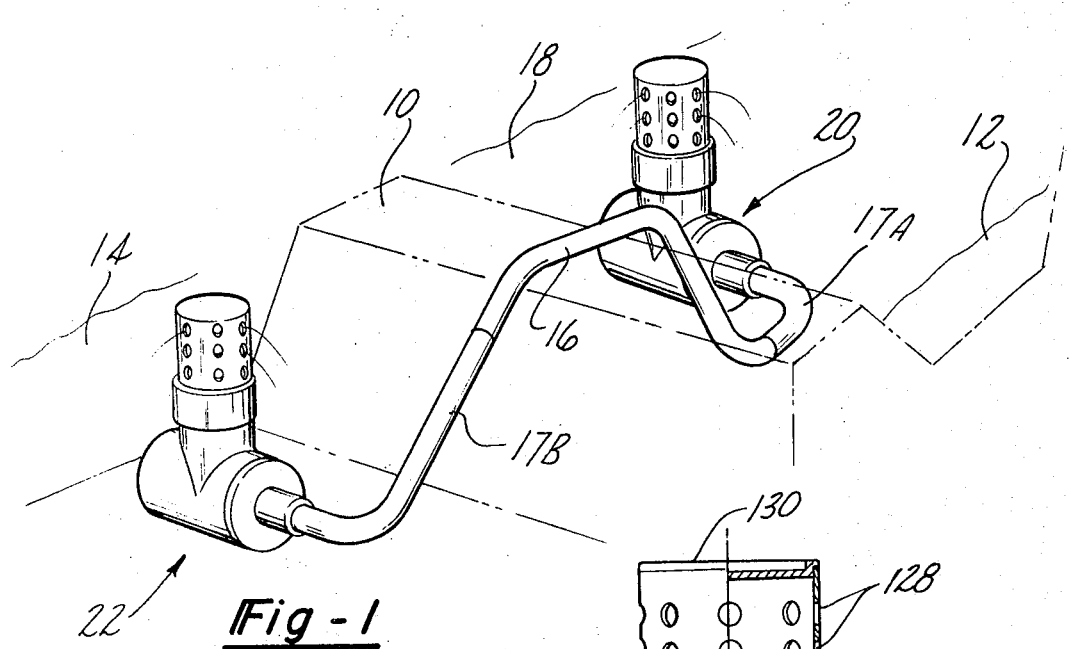
FIG. 1 is a view of an irrigation siphon apparatus, illustrating the preferred embodiment of the invention, and employed to pass water from a supply channel to a lower field.

Referring to the drawings, a typical irrigation field includes an elongated levee 10 forming the bank of a supply ditch 12 which receives water that is to be passed to a lower field 14 on the opposite side of levee 10. A preferred siphon apparatus comprises an elongated flexible conduit 16. An L-shapted, rigid pipe 17A is mounted on one end of conduit 16, and a similar L-shaped pipe 17B is carried at the opposite end of the conduit, below the level of water 18 in ditch 12.

A pair of similarly shaped siphon valves 20 and 22 are mounted on the pipes 17A and 17B, respectively. The two valves are similar to one another so that a description of one will apply to the other except that valve 20 functions as an inlet valve and valve 22 functions as an outlet valve in accordance with the passage of water through conduit 16.

Figure 2:
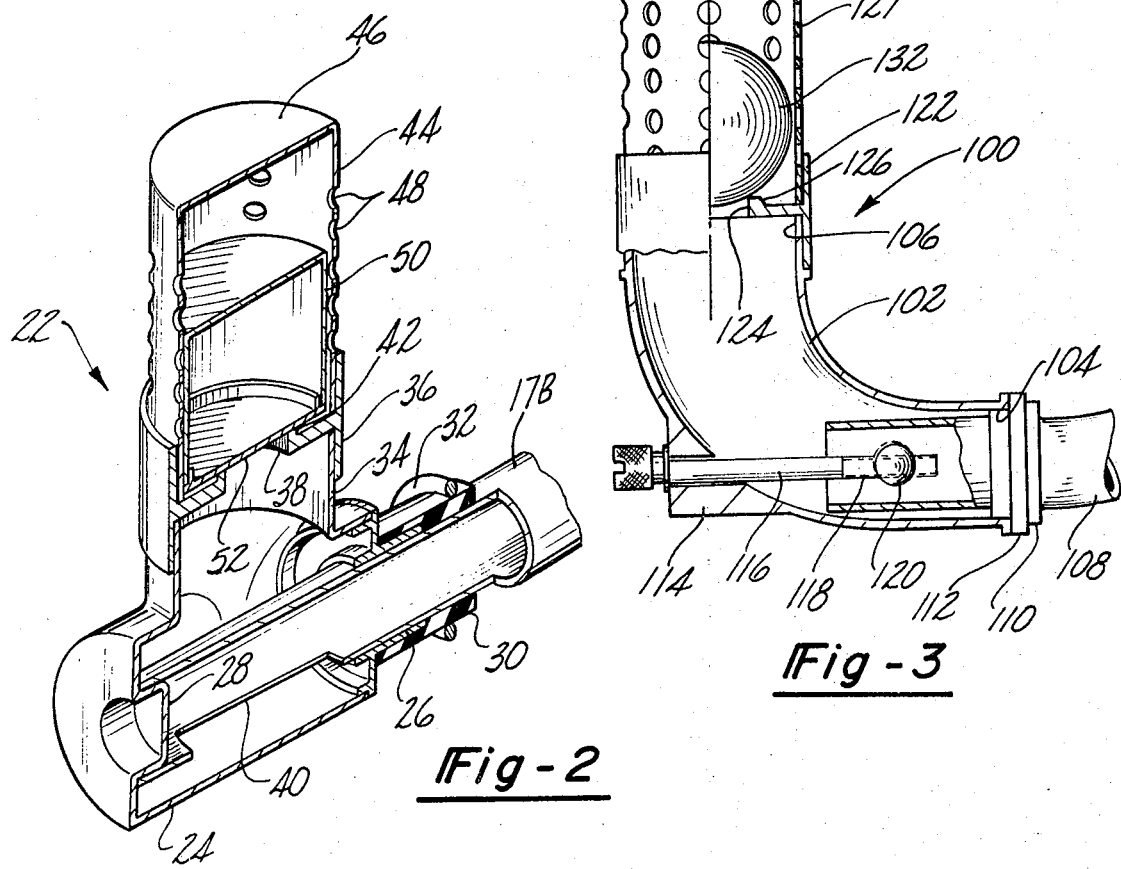
FIG. 2 is a sectional view of a siphon valve mounted on one end of the siphon of FIG. 1.

Referring to FIG. 2, outlet valve 22 has a hollow elbow-shaped body 24 supporting a collar 26. Pipe 17B is received through collar 26 and supported at its extreme end on a pivot 28 in such a manner that body 24 can be pivoted about the end of pipe 17B. A cylindrical bushing 30 is mounted on both collar 26 and pipe 17B to provide a seal.

A resilient ring 32 is mounted on bushing 30. When ring 32 is removed from the bushing, body 24 can be pivoted to a selected position with respect to pipe 17B. When ring 32 is mounted on the bushing, body 24 is clamped in its position on pipe 17B.

Body 24 has a short tubular section 34, and a sleeve 36 mounted on tubular section 34. Sleeve 36 has an opening 38 for passing water at right angles to the direction of water flow through an opening 40 in pipe 17B.

An annular shoulder 42 is formed about outlet opening 38.

A cylindrical strainer 44 has its lower end received in sleeve 36. A wall 46 closes the upper end of strainer 44. Strainer 44 has a plurality of openings 48 for passing water.

A cylindrical float 50 having a diameter slightly less than that of strainer 44 but larger than that of outlet opening 38 is mounted in the strainer. Float 50 has a wall 52 for engaging shoulder 42 to form a water-tight seal blocking the passage of water through opening 38. Float 50 is movable between a lower position in which it engages shoulder 42 to block seal opening 38, and an upper position in which it allows water to pass through opening 38.

The preferred siphon apparatus is primed by placing it under water. When both valves 20 and 22 are below water level, floats 50 in both valves will open because of their bouyancy thereby allowing water to fill conduit 16. When the conduit is full of water, it can be lifted out of the water by grasping the center of the conduit. When the conduit is lifted out of the water, each float valve 50 drops vertically to close its respective opening 38 thereby trapping the water in the conduit to maintain a primed condition. The siphon can then be carried to any suitable position along the irrigation levee.

When either siphon 20 or 22 is positioned below the water level of ditch 12, and the other siphon is disposed at substantially the same height, water will start to pass through the siphon. The two siphons are placed on opposite sides of the levee and pipes 17A and 17B adjusted to conform to the inclination of the levee banks while each valve body is disposed in an upright position.

The rate of water flow through the siphon can be adjusted by raising or lowering outlet valve 22. As long as the inlet valve is submerged below water level, the flow of water through the apparatus will continue. However, when the water level falls in ditch 12 to cause float 50 to approach inlet opening 38, the water level will reach a height in which the float will become sucked into the valve seat thereby closing off the water flow.

Float 50 at the outlet unit responds to this closing off action by blocking its respective opening 38. This positive sealing of both the inlet and the outlet valves also reduces the tendency of the water in conduit 16 to evaporate. In addition, the strainers not only prevent the entry of particles that might block water flow through the apparatus but also shields the inlet and outlet openings from the wind and the sun. Thus, the preferred apparatus will hold its prime for long periods of flow interruption and is ready to operate as soon as the water level in ditch 12 is restored to its normal height.

Figure 3:
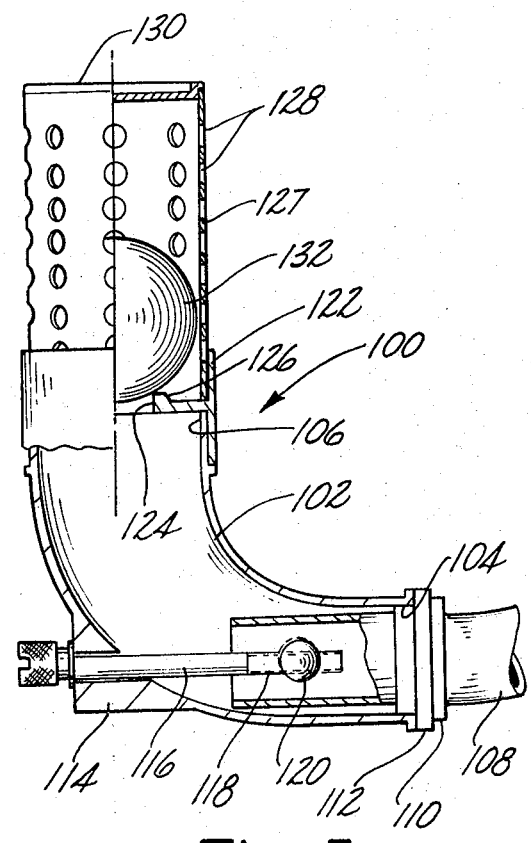
FIG. 3 is a sectional view of a modified siphon valve.

Now referring to FIG. 3, another valve 100 is illustrated that may be used in place of valve 20.

Siphon 100 comprises a hollow elbow 102 having openings 104 and 106. Opening 104 is formed at right angles to opening 106 and the diameter of body 102 progressively increases from opening 104 to opening 106. An L-shaped pipe 108, which is formed of a rigid material, has an integral collar 110 slightly larger in diameter than opening 104. Collar 110 is arranged such that the extreme end of conduit 108 is disposed adjacent the bend in elbow 102. A resilient bushing 112 is mounted on conduit 108 between collar 110 and opening 104 to form a water-tight seal.

A boss 114 is mounted on elbow 102 adjacent the end of conduit 108. A fastener 116 is seated on boss 114 and has an inner threaded end 118 engaged with a crossmember 120 mounted adjacent the end of conduit 108 such that by turning fastener 116, collar 110 can be firmly engaged with bushing 112. By turning fastener 116 in the opposite direction, collar 110 can be released from bushing 112 to permit elbow 102 to be rotated to a selected position with respect to the end of conduit 108.

A valve sleeve 122 is mounted on the end 106 of the elbow. Sleeve 122 has an opening 124 for passing water either into or out of elbow 102. An annular shoulder 126 is formed about the edge of opening 124. A cylindrical strainer 127 having a plurality of openings 128 is seated in sleeve 122. A wall 130 blocks the upper end of strainer 127.

A ball-shaped float 132 having a diameter larger than that of shoulder 126 is disposed in cage 127. When float 132 is raised above shoulder 126, water can pass through opening 124 and out strainer openings 128 or in the reverse direction depending upon whether siphon 100 is receiving water into or passing water from the siphon. Float 132 is formed with a diameter chosen such that the float cooperates with the shoulder to form a water-tight seal to block water flow through opening 124.

Having described my invention, I claim:

1. Irrigation siphon apparatus comprising:
an elongated conduit having an inlet end and an outlet end, and a mid-section disposed above the inlet end and the outlet end;
a first valve connected to the inlet end of the conduit for passing liquid thereto, and a second valve connected to the outlet end of the conduit for receiving liquid therefrom, said valves being similarly shaped and each including:
a hollow body having a top opening and being mounted on the conduit to position the top opening above the ends of the conduit;
a hollow strainer mounted on each body above the top opening to enclose the top opening;
a float mounted in each hollow strainer to be movable therein, the float being disposed in the top opening to block the passage of liquid therethrough, and being larger than the top opening whereby the float adjacent the inlet end of the conduit is buoyantly raised from its top opening by liquid being disposed in the strainer enclosing such float, and the float adjacent the outlet end of the conduit is raised from its top opening by liquid being received from the conduit.

2. Irrigation apparatus as defined in claim 1, in which the float is a ball.

3. Irrigation apparatus as defined in claim 1, including a resilient ring mounted on the conduit for clamping it to the body.

4. Irrigation apparatus as defined in claim 1, in which the body has a pair of hollow legs connected together to form an elbow and the conduit is received in one leg of the elbow and the body opening is formed in the other leg.

5. Irrigation apparatus as defined in claim 1, including means for releasably connecting each end of the conduit to its respective valve.

6. Siphon apparatus as defined in claim 1, in which the body includes an angular ridge having a flat top surface defining the top opening, the ridge being mounted in the body to receive the float.

* * * * *